US011539036B2

United States Patent
Sasaki et al.

(10) Patent No.: US 11,539,036 B2
(45) Date of Patent: Dec. 27, 2022

(54) BATTERY

(71) Applicant: Panasonic Intellectual Property Management Co., Ltd., Osaka (JP)

(72) Inventors: Izuru Sasaki, Kyoto (JP); Akihiro Sakai, Nara (JP); Yuta Sugimoto, Hyogo (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 224 days.

(21) Appl. No.: 16/930,996

(22) Filed: Jul. 16, 2020

(65) Prior Publication Data

US 2020/0350623 A1   Nov. 5, 2020

Related U.S. Application Data

(63) Continuation of application No. PCT/JP2018/042059, filed on Nov. 14, 2018.

(30) Foreign Application Priority Data

Jan. 26, 2018   (JP) .............................. JP2018-011522

(51) Int. Cl.
  *H01M 4/131*   (2010.01)
  *H01M 4/505*   (2010.01)
  (Continued)

(52) U.S. Cl.
  CPC .......... *H01M 4/131* (2013.01); *H01M 4/505* (2013.01); *H01M 4/525* (2013.01);
  (Continued)

(58) Field of Classification Search
  None
  See application file for complete search history.

(56) References Cited

U.S. PATENT DOCUMENTS

| 2012/0308900 A1 | 12/2012 | Ogasa |
| 2013/0260258 A1 | 10/2013 | Tsuchida et al. |
| 2016/0365607 A1 | 12/2016 | Yokoyama |

FOREIGN PATENT DOCUMENTS

| JP | 2006-244734 | 9/2006 |
| JP | 2012-099323 | 5/2012 |

(Continued)

OTHER PUBLICATIONS

Indian Examination Report dated Apr. 1, 2022 for the related Indian Patent Application No. 202047031287.

(Continued)

*Primary Examiner* — Laura Weiner
(74) *Attorney, Agent, or Firm* — McDermott Will & Emery LLP

(57) ABSTRACT

Provided is a battery including a positive electrode including a first positive electrode layer and a second positive electrode layer; a negative electrode; and an electrolyte layer. The first positive electrode layer includes a first positive electrode active material, a first solid electrolyte material, and a coating material. The second positive electrode layer includes a second positive electrode active material and the first solid electrolyte material. The first solid electrolyte material includes lithium, at least one kind selected from the group consisting of metalloid elements and metal elements other than lithium; and at least one kind selected from the group consisting of chlorine and bromine. The first solid electrolyte material does not include sulfur.

7 Claims, 1 Drawing Sheet

(51) Int. Cl.
    *H01M 4/525*     (2010.01)
    *H01M 10/0562*     (2010.01)
    *H01M 4/02*     (2006.01)

(52) U.S. Cl.
    CPC .. *H01M 10/0562* (2013.01); *H01M 2004/028* (2013.01); *H01M 2300/008* (2013.01)

(56) References Cited

FOREIGN PATENT DOCUMENTS

| | | |
|---|---|---|
| JP | 2017-004705 | 1/2017 |
| JP | 2017-111954 | 6/2017 |
| JP | 2018-101466 | 6/2018 |

OTHER PUBLICATIONS

International Search Report of PCT application No. PCT/JP2018/042059 dated Dec. 25, 2018.

Andreas Bohnsack et al., "The Bromides Li3MBr6 (M=Sm-Lu, Y): Synthesis, Crystal Structure, and Ionic Mobility", Journal of Inorganic and General Chemistry, Sep. 1997, vol. 623/Issue 9, pp. 1352-1356.

Andreas Bohnsack et al., "Ternary Chlorides of the Rare-Earth Elements with Lithium, Li3MCl6 (M=Tb-Lu, Y, Sc) Synthesis, Crystal Structures, and Ionic Motion", Journal of Inorganic and General Chemistry, Jul. 1997, vol. 623/Issue 7, pp. 1067-1073.

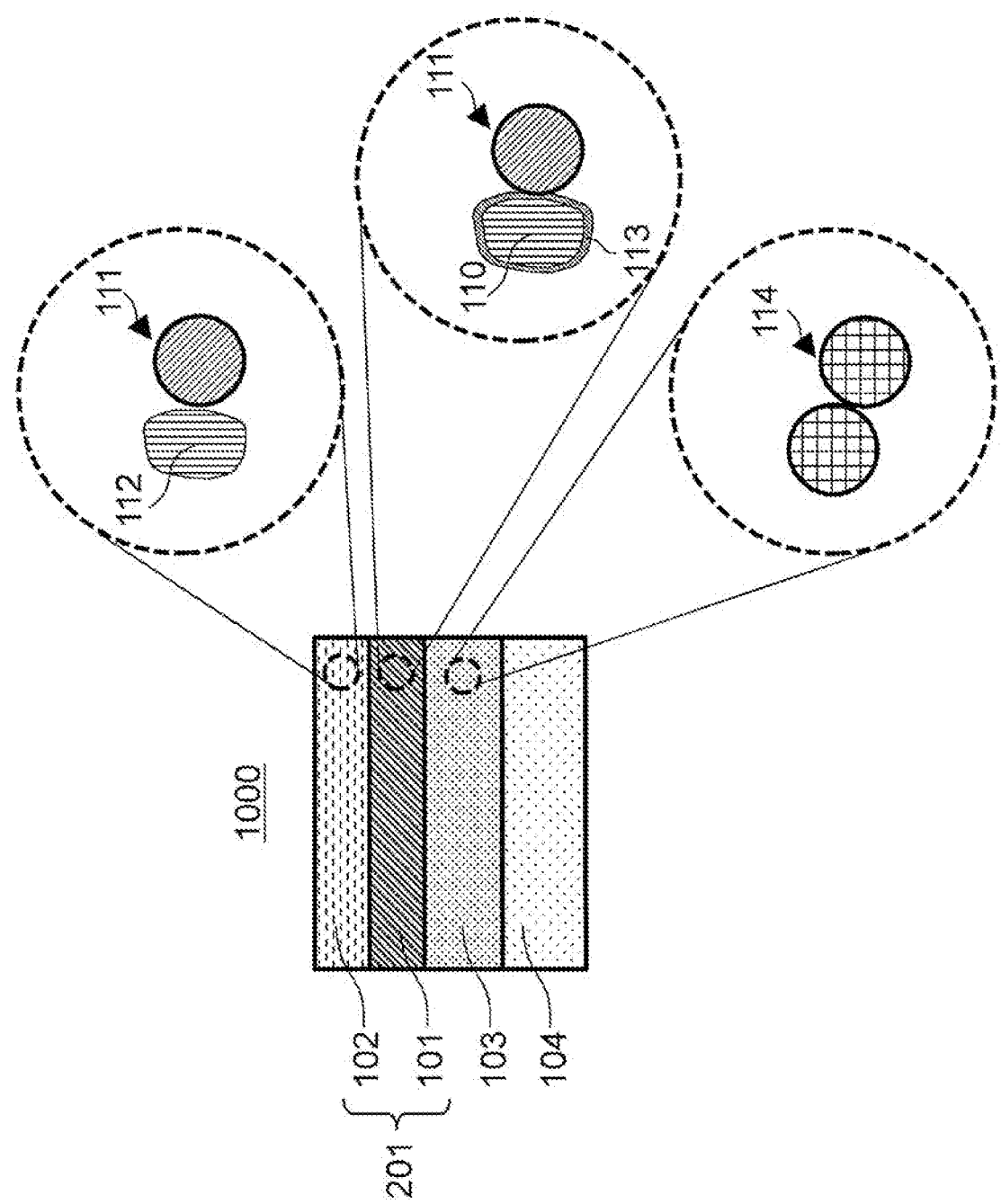

BATTERY

BACKGROUND

1. Technical Field

The present disclosure relates to a battery.

2. Description of the Related Art

Patent Literature 1 discloses an all-solid battery using, as a solid electrolyte, a halide including indium.

CITATION LIST

Patent Literature

Patent Literature 1: Japanese Patent Application Publication No. 2006-244734

SUMMARY

In the prior art, further increase in a charge capacity of a battery is desired.

The battery according to one aspect of the present disclosure comprises:
a positive electrode including a first positive electrode layer and a second positive electrode layer;
a negative electrode; and
an electrolyte layer located between the positive electrode and the negative electrode,
wherein
the first positive electrode layer is located between the second positive electrode layer and the electrolyte layer;
the first positive electrode layer includes a first positive electrode active material, a first solid electrolyte material, and a coating material;
the second positive electrode layer includes a second positive electrode active material and the first solid electrolyte material;
the coating material is located on a surface of the first positive electrode active material;
the second positive electrode layer does not include the coating material;
the first solid electrolyte material includes:
lithium;
at least one kind selected from the group consisting of metalloid elements and metal elements other than lithium; and
at least one kind selected from the group consisting of chlorine and bromine; and
the first solid electrolyte material does not include sulfur.

According to the present disclosure, the charge capacity of the battery can be increased.

BRIEF DESCRIPTION OF THE DRAWINGS

FIG. 1 is a cross-sectional view showing a schematic configuration of a battery 1000 in a first embodiment.

DETAILED DESCRIPTION OF THE EMBODIMENT

Hereinafter, an embodiment of the present disclosure will be described with reference to the drawings.

First Embodiment

FIG. 1 is a cross-sectional view showing a schematic configuration of a battery 1000 in the first embodiment.

The battery 1000 in the first embodiment comprises a positive electrode 201, a negative electrode 104, and an electrolyte layer 103.

The positive electrode 201 includes a first positive electrode layer 101 and a second positive electrode layer 102.

The electrolyte layer 103 is located between the positive electrode 201 and the negative electrode 104.

The first positive electrode layer 101 is located between the second positive electrode layer 102 and the electrolyte layer 103.

The first positive electrode layer 101 includes a first positive electrode active material, a first solid electrolyte material, and a coating material.

The second positive electrode layer 102 includes a second positive electrode active material and the first solid electrolyte material.

The coating material is located on the surface of the first positive electrode active material.

The first solid electrolyte material is a material represented by the following composition formula (1):

$$Li_\alpha M_\beta X_\gamma \qquad \text{Formula (1)}$$

where, $\alpha$, $\beta$ and $\gamma$ are values larger than 0.

M includes at least one of metalloid elements and metal elements other than Li.

X includes at least one of Cl and Br.

According to the above configuration, a charge capacity of the battery can be increased.

A halide solid electrolyte has high ion conductivity and excellent thermal stability. The halide solid electrolyte does not generate a harmful gas such as hydrogen sulfide. By using the halide solid electrolyte as the first solid electrolyte material, an output characteristic and thermal stability of the battery can be improved, and the generation of a harmful gas such as hydrogen sulfide can be suppressed.

In addition, a halide solid electrolyte including at least one of metalloid elements and metal elements other than Li has higher ion conductivity than a halide solid electrolyte such as LiI composed only of Li and a halogen element. Therefore, if the halide solid electrolyte including the at least one of the metalloid elements and the metal elements other than Li is used for the battery, the output characteristic of the battery can be improved.

The "metalloid elements" are B, Si, Ge, As, Sb, and Te.

The "metal elements" are all elements included in Groups 1 to 12 of the periodic table except for hydrogen, and all the elements included in Groups 13 to 16 of the periodic table except for the above-mentioned metalloid elements, C, N, P, O, S, and Se. In other words, the metal element becomes a cation, if the metal element forms an inorganic compound with a halogen compound.

In the composition formula (1), M may include Y (=yttrium).

In other words, the first solid electrolyte material may include Y as a metal element.

According to the above configuration, the ion conductivity of the first solid electrolyte material can be further improved. Thereby, the charge/discharge efficiency of the battery can be further improved.

The first solid electrolyte material including Y may be, for example, a compound represented by a composition formula $Li_a Me_b Y_c X_6$ (a+mb+3c=6 and c>0 are satisfied) (Me: at least one of metalloid elements and metal elements other than Li and Y) (m: valence of Me).

As Me, any of Mg, Ca, Sr, Ba, Zn, Sc, Al, Ga, Bi, Zr, Hf, Ti, Sn, Ta, and Nb, or a mixture thereof may be used.

According to the above configuration, the ion conductivity of the first solid electrolyte material can be further improved.

In the composition formula (1), $2.5 \leq \alpha \leq 3$;

$1 \leq \beta \leq 1.1$, and $\gamma = 6$ may be satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A1):

$Li_{6-3d}Y_dX_6$      Formula (A1)

where, in the composition formula (A1), X is at least one of Cl and Br.

In addition, in the composition formula (A1), $0<d<2$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A2):

$Li_3YX_6$      Formula (A2)

where, in the composition formula (A2), X is at least one of Cl and Br.

According to the above configuration, the ion conductivity of the first solid electrolyte material can be further improved. Thereby, the charge/discharge efficiency of the battery can be further improved.

The first solid electrolyte material may be a material represented by the following composition formula (A3):

$Li_{3-3\delta}Y_{1+\delta}Cl_6$      Formula (A3)

where, in the composition formula (A3), $0<\delta \leq 0.15$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A4):

$Li_{3-3\delta}Y_{1+\delta}Br_6$      Formula (A4)

where, in the composition formula (A4), $0<\delta \leq 0.25$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A5):

$Li_{3-3\delta+a}Y_{1+\delta-a}Me_aCl_{6-x}Br_x$      Formula (A5)

where, in the composition formula (A5), Me is one or more kinds of elements selected from the group consisting of Mg, Ca, Sr, Ba, and Zn.

In addition, in the composition formula (A5), $-1<\delta<2$;

$0<a<3$;

$0<(3-3\delta+a)$;

$0<(1+\delta-a)$; and $0 \leq x \leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A6):

$Li_{3-3\delta}Y_{1+\delta-a}Me_aCl_{6-x}Br_x$      Formula (A6)

where, in the composition formula (A6), Me is one or more kinds of elements selected from the group consisting of Al, Sc, Ga, and Bi.

In addition, in the composition formula (A6), $-1<\delta<1$;

$0<a<2$;

$0<(1+\delta-a)$; and $0 \leq x \leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A7):

$Li_{3-3\delta-a}Y_{1+\delta-a}Me_aCl_{6-x}Br_x$      Formula (A7)

where, in the composition formula (A7), Me is one or more kinds of elements selected from the group consisting of Zr, Hf, and Ti.

In addition, in the composition formula (A7), $-1<\delta<1$;

$0<a<1.5$;

$0<(3-3\delta-a)$;

$0<(1+\delta-a)$; and $0 \leq x \leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A8):

$Li_{3-3\delta-2a}Y_{1+\delta-a}Me_aCl_{6-x}Br_x$      Formula (A8)

where, in the composition formula (A8), Me is one or more kinds of elements selected from the group consisting of Ta and Nb.

In the composition formula (A8), $-1<\delta<1$;

$0<a<1.2$;

$0<(3-3\delta-2a)$;

$0<(1+\delta-a)$; and $0 \leq x \leq 6$ are satisfied.

According to the above configuration, the ion conductivity of the first solid electrolyte material can be further improved. Thereby, the charge/discharge efficiency of the battery can be further improved.

As the first solid electrolyte material, for example, $Li_3YX_6$, $Li_2MgX_4$, $Li_2FeX_4$, $Li(Al, Ga, In)X_4$, or $Li_3(Al, Ga, In)X_6$ (X: Cl, Br) may be used.

The electrolyte layer 103 may include a second solid electrolyte material.

The second solid electrolyte material is a material represented by the following composition formula (2):

$$Li_{\alpha'}M'_{\beta'}X'_{\gamma'} \qquad \text{Formula (2)}$$

where α', β', and γ' are values greater than zero;

M' includes at least one of metalloid elements and metal elements other than Li; and X' includes I and at least one of Cl and Br.

According to the above configuration, the charge capacity of the battery can be further increased.

Patent Literature 1 discloses that, in the all-solid secondary battery including a solid electrolyte consisting of a compound including indium, it is preferable that the positive electrode active material has an electric potential with regard to Li of not more than 3.9 V on average, and that thereby a film consisting of a decomposition product due to oxidative decomposition of a solid electrolyte is formed to provide a good charge/discharge characteristic. In addition, a general layered transition metal oxide positive electrode such as $LiCoO_2$ or $LiNi_{0.8}Co_{0.15}Al_{0.05}O_2$ is disclosed as a positive electrode active material having an electric potential with regard to Li of not more than 3.9 V on average.

On the other hand, as a result of intensive studies by the present inventors, in a case where the halide solid electrolyte including I (namely, the second solid electrolyte material) and the positive electrode active material are in direct contact, even if the positive electrode active material having an electric potential with regard to Li of not more than 3.9 V is used, there is a problem that the halide solid electrolyte is oxidized and decomposed during charge to increase internal resistance of the battery, and that the charge capacity is decreased. The present inventors found that the reason therefor is oxidation reaction of I included in the halide solid electrolyte. Specifically, it is conceivable that, in addition to the normal charging reaction in which lithium and electrons are extracted from the positive electrode active material in the positive electrode material, a side reaction in which electrons are also extracted from the halide solid electrolyte including I in contact with the positive electrode active material occurs. As a result, an oxidative decomposition layer having poor lithium-ion conductivity is formed between the active material and the halide solid electrolyte, and the oxidative decomposition layer functions as a large interface resistance in the electrode reaction of the positive electrode. In order to solve this problem, it is necessary to suppress electron transfer to the halide solid electrolyte including I to suppress the formation of the oxidative decomposition layer.

If a coating layer including a coating material is provided on the positive electrode active material, the coating material is interposed between the halide solid electrolyte positive electrode active material including I and the positive electrode active material. Thereby, the electron transfer to the halide solid electrolyte is suppressed by the coating material. As a result, the oxidative decomposition of the halide solid electrolyte does not occur, and the charge capacity increases.

On the other hand, since the halide solid electrolyte which does not include I (namely, the first solid electrolyte material) is excellent in oxidation stability, even if the halide solid electrolyte which does not include I is brought into direct contact with the positive electrode active material, the oxidative decomposition does not occur, or a reaction does not continue even if the oxidative decomposition occurs. Therefore, if the halide solid electrolyte that does not include I is used, if the coating layer including the coating material is provided on the positive electrode active material, the coating layer functions as a resistance layer that prevents migration of lithium ions to decrease the charge capacity of the battery.

According to the configuration of the present disclosure, the coating material is provided on the surface of the first positive electrode active material included in the first positive electrode layer 101 that is in direct contact with the electrolyte layer 103 including the halide solid electrolyte including I. For this reason, the oxidative decomposition of the halide solid electrolyte including I is suppressed.

In addition, the coating layer including the coating material is not provided on the surface of the second positive electrode active material included in the second positive electrode layer 102 that is not in direct contact with the electrolyte layer 103 including the halide solid electrolyte including I. For this reason, the coating layer does not function as the resistance layer. Therefore, compared to a battery which comprises only the second positive electrode layer 102 and a battery which comprises only the first positive electrode layer 101, in the battery having the configuration of the present disclosure, the charge capacity of the battery is increased.

In addition, a halide solid electrolyte including I is more excellent in ion conductivity than a halide solid electrolyte which does not include I. For this reason, according to the above configuration, the output characteristic of the battery can be improved, compared to a case where only the halide solid electrolyte which does not include I is used for the electrolyte layer 103.

Further, by using the halide solid electrolyte for the second solid electrolyte material, the output characteristic and thermal stability of the battery can be improved, and the generation of the harmful gas such as hydrogen sulfide can be suppressed.

In the composition formula (2), M' may include Y (=yttrium).

In other words, the second solid electrolyte material may include Y as a metal element.

According to the above configuration, the ion conductivity of the second solid electrolyte material can be further improved. Thereby, the charge/discharge efficiency of the battery can be further improved.

The second solid electrolyte material including Y may be, for example, a compound represented by a composition formula $Li_aMe'_bY_cX'_6$ (a+mb+3c=6 and c>0 are satisfied) (Me': at least one of metalloid elements and metal elements other than Li and Y) (m: valence of Me').

As Me', any of Mg, Ca, Sr, Ba, Zn, Sc, Al, Ga, Bi, Zr, Hf, Ti, Sn, Ta, and Nb, or a mixture thereof may be used.

According to the above configuration, the ion conductivity of the second solid electrolyte material can be further improved.

The second solid electrolyte material may be $Li_3YBr_2Cl_2I_2$.

According to the above configuration, the ion conductivity of the second solid electrolyte material can be further improved. Thereby, the charge/discharge efficiency of the battery can be further improved.

The second solid electrolyte material may be a material represented by the following composition formula (B1):

$$Li_{6-3d}Y_dX_6 \qquad \text{Formula (B1)}$$

where, in the composition formula (B1), X includes I and at least one of Cl and Br. In the composition formula (B1), $0<d<2$ is satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B2):

$$Li_3YX_6 \qquad \text{Formula (B2)}$$

where, in the composition formula (B2), X includes I and at least one of Cl and Br.

According to the above configuration, the ion conductivity of the second solid electrolyte material can be further improved. Thereby, the charge/discharge efficiency of the battery can be further improved.

The second solid electrolyte material may be a material represented by the following composition formula (B3):

$$Li_{3-3\delta+a}Y_{1+\delta-a}Me_aCl_{6-x-y}Br_xI_y \qquad \text{Formula (B3)}$$

where, in the composition formula (B3), Me is one or more kinds of elements selected from the group consisting of Mg, Ca, Sr, Ba, and Zn.

In the composition formula (B3), $-1<\delta<2;$ $0<a<3;$ $0<(3-3\delta+a);$ $0<(1+\delta-a);$ $0\le x<6;$ $0<y\le 6;$ and $(x+y)<6$ are satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B4):

$$Li_{3-3\delta}Y_{1+\delta-a}Me_aCl_{6-x-y}Br_xI_y \qquad \text{Formula (B4)}$$

where, in the compositional formula (B4), Me is one or more kinds of elements selected from the group consisting of Al, Sc, Ga, and Bi.

In the composition formula (B4), $-1<\delta<1;$ $0<a<2;$ $0<(1+\delta-a);$ $0\le x<6;$ $0<y\le 6;$ and $(x+y)<6$ are satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B5):

$$Li_{3-3\delta-a}Y_{1+\delta-a}Me_aCl_{6-x-y}Br_xI_y \qquad \text{Formula (B5)}$$

where, in the composition formula (B5), Me is one or more kinds of elements selected from the group consisting of Zr, Hf, and Ti.

In the composition formula (B5), $-1<\delta<1;$ $0<a<1.5;$ $0<(3-3\delta-a);$ $0<(1+\delta-a);$ $0\le x<6;$ $0<y\le 6;$ and $(x+y)<6$ are satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B6):

$$Li_{3-3\delta-2a}Y_{1+\delta-a}Me_aCl_{6-x-y}Br_xI_y \qquad \text{Formula (B6)}$$

where, in the composition formula (B6), Me is one or more kinds of elements selected from the group consisting of Ta and Nb.

In the composition formula (B6), $-1<\delta<1;$ $0<a<1.2;$ $0<(3-3\delta-2a);$ $0<(1+\delta-a);$ $0\le x<6;$ $0<y\le 6;$ and $(x+y)<6$ are satisfied.

According to the above configuration, the ion conductivity of the second solid electrolyte material can be further improved. Thereby, the charge/discharge efficiency of the battery can be further improved.

As the second solid electrolyte material, for example, $Li_3YX_6$, $Li_2MgX_4$, $Li_2FeX_4$, $Li(Al, Ga, In)X_4$, or $Li_3(Al, Ga, In)X_6$ (X: includes I and at least one of Cl and Br) can be used.

The electrolyte layer 103 may include the second solid electrolyte material as a main component. In other words, the electrolyte layer 103 may include the second solid electrolyte material, for example, at a weight ratio of not less than 50% (not less than 50% by weight) with respect to the entire electrolyte layer 103.

According to the above configuration, the charge/discharge characteristic of the battery can be further improved.

The electrolyte layer 103 may include the second solid electrolyte material, for example, at a weight ratio of not less than 70% (not less than 70% by weight) with respect to the entire electrolyte layer 103.

According to the above configuration, the charge/discharge characteristic of the battery can be further improved.

The electrolyte layer 103 includes the second solid electrolyte material as the main component thereof, and the electrolyte layer 103 may further include inevitable impurities. The electrolyte layer 103 may include the starting materials used for the synthesis of the second solid electrolyte material. The second electrolyte layer may include by-products or decomposition products generated when the second solid electrolyte material is synthesized.

In addition, the electrolyte layer 103 may include the second solid electrolyte material, for example, at a weight ratio of 100% (100% by weight) with respect to the entire electrolyte layer 103, except for the inevitable impurities.

According to the above configuration, the charge/discharge characteristic of the battery can be further improved.

The electrolyte layer 103 may be comprised only from the second solid electrolyte material.

The second positive electrode layer 102 may be located without being in contact with the electrolyte layer 103.

In other words, in the configuration of the present disclosure, the second positive electrode layer 102 and the electrolyte layer 103 including a halide solid electrolyte including I does not have to be in direct contact with each other by being separated by the first positive electrode layer 101 including a halide solid electrolyte which does not include I.

According to the above configuration, the oxidation of the halide solid electrolyte including I can be suppressed, and the charge/discharge efficiency of the battery can be improved.

The first positive electrode active material and the second positive electrode active material may be different materials from each other (namely, different positive electrode active materials).

Alternatively, the first positive electrode active material and the second positive electrode active material may be the same material as each other (namely, the same positive electrode active material).

As the first positive electrode active material and the second positive electrode active material, a positive electrode active material having a property of storing and releasing metal ions (for example, lithium ions) can be used. Examples of the positive electrode active material include a lithium-containing transition metal oxide (e.g., Li(NiCoAl)$O_2$, Li(NiCoMn)$O_2$, or LiCoO$_2$), a transition metal fluoride, a polyanionic material, a fluorinated polyanionic material, a transition metal sulfide, a transition metal oxysulfide, or a transition metal oxynitride. In particular, if a lithium-containing transition metal oxide is used as the positive electrode active material, manufacturing cost can be lowered and an average discharge voltage can be increased.

In the first embodiment, at least one of the first positive electrode active material and the second positive electrode active material may be a lithium nickel-cobalt-manganese oxide. For example, at least one of the first positive electrode active material and the second positive electrode active material may be Li(NiCoMn)$O_2$. According to the above configuration, the energy density of the battery can be further increased.

As the coating material, for example, a sulfide solid electrolyte, an oxide solid electrolyte, a halide solid electrolyte, a polymer solid electrolyte, or a complex hydride solid electrolyte may be used.

Examples of the oxide solid electrolyte which may be used as the coating material include a Li—Nb—O compound such as LiNbO$_3$, a Li—B—O compound such as LiBO$_2$ or Li$_3$BO$_3$, a Li—Al—O compound such as LiAlO$_2$, a Li—Si—O compound such as Li$_4$SiO$_4$, Li$_2$SO$_4$, a Li—Ti—O compound such as Li$_4$Ti$_5$O$_{12}$, a Li—Zr—O compound such as Li$_2$ZrO$_3$, a Li—Mo—O compound such as Li$_2$MoO$_3$, a Li—V—O compound such as LiV$_2$O$_5$, and a Li—W—O such as Li$_2$WO$_4$.

The coating material may be an oxide solid electrolyte.

The oxide solid electrolyte has high high-potential stability. For this reason, the charge/discharge efficiency can be further improved by using the oxide solid electrolyte.

The oxide solid electrolyte that is the coating material may be lithium niobate. For example, the oxide solid electrolyte that is the coating material may be LiNbO$_3$.

Lithium niobate has higher ion conductivity and higher high-potential stability. Therefore, the charge/discharge efficiency can be further improved by using lithium niobate.

As shown in FIG. 1, the first positive electrode layer 101 may include first solid electrolyte particles 111, first positive electrode active material particles 110, and a coating layer 113.

The first positive electrode active material particles 110 and the first solid electrolyte particles 111 may be separated by the coating layer 113 so as not to be in direct contact with each other.

The coating layer 113 is a layer including the coating material. In other words, in the example shown in FIG. 1, the coating layer 113 is provided on the surface of the first positive electrode active material particle 110.

The thickness of the coating layer 113 may be not less than 1 nm and not more than 100 nm.

If the thickness of the coating layer 113 is not less than 1 nm, the direct contact between the first positive electrode active material particles 110 and the first solid electrolyte particles 111 can be suppressed, and the side reaction of the first solid electrolyte material can be suppressed. As a result, the charge/discharge efficiency can be improved.

In addition, the thickness of the coating layer 113 is not too thick, since the thickness of the coating layer 113 is not more than 100 nm. For this reason, the internal resistance of the battery can be sufficiently lowered. As a result, the energy density of the battery can be increased.

Further, the coating layer 113 may uniformly coat the first positive electrode active material particles 110. The direct contact between the first positive electrode active material particles 110 and the first solid electrolyte particles 111 can be suppressed, and the side reaction of the first solid electrolyte material can be suppressed. As a result, the charge/discharge efficiency can be improved.

Alternatively, the coating layer 113 may coat a part of the first positive electrode active material particles 110. If the plurality of first positive electrode active material particles 110 are in direct contact with each other through a part which does not have the coating layer 113, the electron conductivity between the particles of the first positive electrode active material particles 110 is improved. As a result, the operation at the high output of the battery is allowed.

As shown in FIG. 1, the second positive electrode layer 102 may include first solid electrolyte particles 111 and second positive electrode active material particles 112.

As shown in FIG. 1, the electrolyte layer 103 may include second solid electrolyte particles 114.

A shape of each of the first solid electrolyte particles 111 included in the first positive electrode layer 101 and the second positive electrode layer 102 is not particularly limited, and may be, for example, an acicular shape, a spherical shape, or an elliptical spherical shape. For example, the shape of the electrolyte material may be particles.

For example, if the shape of each of the first solid electrolyte particles 111 in the first embodiment is particulate (for example, spherical), the median diameter thereof may be not more than 100 μm.

If the median diameter is more than 100 μm, there is a possibility that a good dispersion state of the positive electrode active material and the first solid electrolyte material fails to be formed in the positive electrode. As a result, the charge/discharge characteristic deteriorate.

In the first embodiment, the median diameter of the first solid electrolyte particles 111 may be not more than 10 μm.

According to the above configuration, in the positive electrode, the good dispersion state of the positive electrode active material and the first solid electrolyte particles 111 can be formed.

In the first embodiment, the first solid electrolyte particles 111 may be smaller than the median diameter of the positive electrode active material particles.

According to the above configuration, in the positive electrode, a better dispersion state of the first solid electrolyte particles 111 and the positive electrode active material can be formed.

The median diameter of the positive electrode active material particles (namely, the first positive electrode active material particles 110 and the second positive electrode active material particles 112) may be not less than 0.1 μm and not more than 100 μm.

If the median diameter of the positive electrode active material particles is less than 0.1 μm, there is a possibility that a good dispersion state of the positive electrode active material and the first solid electrolyte material fails to be formed form in the positive electrode. As a result, the charge/discharge characteristic of the battery are lowered.

On the other hand, if the median diameter of the positive electrode active material particles is more than 100 μm, lithium diffusion in the positive electrode active material is made slow. As a result, it may be difficult to operate the battery at a high output.

The median diameter of the positive electrode active material particles may be larger than the median diameter of the first solid electrolyte particles 111. Thereby, a good dispersion state of the positive electrode active material and the first solid electrolyte material can be formed.

The shape of each of the second solid electrolyte particles 114 included in the electrolyte layer 103 and the median diameter of the second solid electrolyte particles 114 included in the electrolyte layer 103 may be the same as or different from those of the first solid electrolyte particles 111.

With regard to a volume ratio "v:100−v" of the positive electrode active material (namely, the first positive electrode active material and the second positive electrode active material) and the first solid electrolyte material included in the positive electrode, 30≤v≤95 may be satisfied. If v<30, it may be difficult to secure an energy density of the battery sufficiently. In addition, if v>95, it may be difficult to operate at a high output.

The thickness of the first positive electrode layer 101 may be not less than 1 μm and not more than 500 μm. If the thickness of the first positive electrode layer is less than 1 μm, the second positive electrode layer 102 and the electrolyte layer 103 may be in direct contact with each other to increase the internal resistance. In addition, if the thickness of the first positive electrode layer 101 is more than 500 μm, it may be difficult to operate at a high output.

The thickness of the second positive electrode layer 102 may be not less than 1 μm and not more than 500 μm. In addition, if the thickness of the second positive electrode layer 102 is less than 1 μm, it may be difficult to secure an energy density of the battery sufficiently. If the thickness of the second positive electrode layer 102 is more than 500 μm, it may be difficult to operate at a high output.

The thickness of the electrolyte layer 103 may be not less than 1 μm and not more than 300 μm. If the thickness of the electrolyte layer 103 is less than 1 μm, the possibility that the first positive electrode layer 101 and the negative electrode 104 are short-circuited increases. In addition, if the thickness of the electrolyte layer 103 is more than 300 μm, it may be difficult to operate at a high output.

The negative electrode 104 includes a material having a property of storing and releasing metal ions (for example, lithium ions). The negative electrode 104 includes, for example, a negative electrode active material.

As the negative electrode active material, a metal material, a carbon material, an oxide, a nitride, a tin compound, or a silicon compound may be used. The metal material may be a single metal. Alternatively, the metal material may be an alloy. Examples of the metal material include a lithium metal and a lithium alloy. Examples of the carbon material include natural graphite, coke, graphitized carbon, carbon fiber, spherical carbon, artificial graphite, and amorphous carbon. From the viewpoint of capacity density, silicon (Si), tin (Sn), a silicon compound, or a tin compound may be preferably used.

The negative electrode 104 may include an electrolyte material. According to the above configuration, the lithium ion conductivity inside the negative electrode 104 is increased to allow the operation at a high output. The electrolyte material included in the negative electrode 104 is, for example, a solid electrolyte. As the solid electrolyte, for example, a sulfide solid electrolyte, an oxide solid electrolyte, a polymer solid electrolyte, a complex hydride solid electrolyte, or a halide solid electrolyte may be used.

As the sulfide solid electrolyte, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ may be used. In addition, LiX (X: F, Cl, Br, I), $Li_2O$, $MO_q$, or $Li_pMO_q$ (M: any of P, Si, Ge, B, Al, Ga, In, Fe, Zn) (p, q: natural number) may be added.

As the oxide solid electrolyte, for example, a NASICON solid electrolyte such as $LiTi_2(PO_4)_3$ and its element substitution products, a $(LaLi)TiO_3$ perovskite solid electrolyte, a LISICON solid electrolyte such as $Li_{14}ZnGe_4O_{16}$, $Li_4SiO_4$, $LiGeO_4$ and its element substitution, a garnet solid electrolyte such as $Li_7La_3Zr_2O_{12}$ and its element substitution, $Li_3N$ and its H substitution products, $Li_3PO_4$ and its N substitution products, glass to which $Li_2SO_4$ or $Li_2CO_3$ has been added using a Li—B—O compound such as $LiBO_2$ or $Li_3BO_3$ as the base thereof, or glass ceramics may be used.

As the polymer solid electrolyte, for example, a compound of a polymer compound and a lithium salt can be used. The polymer compound may have an ethylene oxide structure. Due to the ethylene oxide structure, a large amount of lithium salt can be included to further increase the ion conductivity. As a lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ may be used. As a lithium salt, one lithium salt selected therefrom may be used alone. Alternatively, a mixture of two or more lithium salts selected therefrom may be used as the lithium salt.

As the complex hydride solid electrolyte, for example, $LiBH_4$—LiI or $LiBH_4$—$P_2S_5$ may be used.

As the halide solid electrolyte, materials exemplified as examples of the first solid electrolyte material or the second solid electrolyte material may be used.

The median diameter of the negative electrode active material particles may be not less than 0.1 μm and not more than 100 μm. If the median diameter of the negative electrode active material particles is less than 0.1 μm, there is a possibility that a good dispersion state of the negative electrode active material particles and the electrolyte material fails to be formed in the negative electrode. Thereby, the charge/discharge characteristic of the battery is lowered. On the other hand, if the median diameter of the negative electrode active material particles is more than 100 μm, the diffusion of lithium in the negative electrode active material particles is made slow. As a result, it may be difficult to operate the battery at a high output.

The median diameter of the negative electrode active material particles may be larger than the median diameter of the electrolyte material. Thereby, the good dispersion state of the negative electrode active material particles and the electrolyte material can be formed.

With regard to a volume ratio "v:100−v" of the negative electrode active material particles and the electrolyte material included in the negative electrode 104, 30≤v≤95 may be satisfied. If v<30, it may be difficult to secure an energy density of the battery sufficiently. In addition, if v>95, it may be difficult to operate at a high output.

The thickness of the negative electrode 104 may be not less than 10 μm and not more than 500 μm. If the thickness of the negative electrode is less than 10 μm, it may be difficult to secure an energy density of the battery sufficiently. In addition, if the thickness of the negative electrode is more than 500 μm, it may be difficult to operate at a high output.

At least one of the positive electrode 201, the electrolyte layer 103, and the negative electrode 104 may include a sulfide solid electrolyte, an oxide solid electrolyte, a polymer solid electrolyte, and a complex hydride solid electrolyte for the purpose of facilitating the exchange of lithium ions and improving the output characteristic of the battery. As the sulfide solid electrolyte, the oxide solid electrolyte, the polymer solid electrolyte, and the complex hydride solid electrolyte, the materials exemplified as the electrolyte materials of the negative electrode 104 may be used.

At least one of the positive electrode 201, the electrolyte layer 103, and the negative electrode 104 includes a non-aqueous electrolyte solution, a gel electrolyte, and an ionic liquid for the purpose of facilitating the exchange of lithium ions and improving the output characteristic of the battery.

The non-aqueous electrolyte includes a non-aqueous solvent and a lithium salt which has been dissolved in the non-aqueous solvent. As the non-aqueous solvent, a cyclic carbonate solvent, a chain carbonate solvent, a cyclic ether solvent, a chain ether solvent, a cyclic ester solvent, a chain ester solvent, or a fluorine solvent may be used. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. As the non-aqueous solvent, one non-aqueous solvent selected from these may be used alone. Alternatively, a combination of two or more kinds of non-aqueous solvents selected from these may be used as the non-aqueous solvent. The non-aqueous electrolyte solution may include at least one kind of fluorine solvent selected from the group consisting of fluoroethylene carbonate, methyl fluoropropionate, fluorobenzene, fluoroethyl methyl carbonate, and fluorodimethylene carbonate. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ may be used. As the lithium salt, one lithium salt selected from these may be used alone. Alternatively, a mixture of two or more kinds of lithium salts selected from these may be used as the lithium salt. The concentration of the lithium salt is, for example, within a range of 0.5 to 2 mol/liter.

As the gel electrolyte, a polymer material including the non-aqueous electrolyte may be used. As the polymer material, polyethylene oxide, polyacrylonitrile, polyvinylidene fluoride, polymethyl methacrylate, or a polymer having an ethylene oxide bond may be used.

The cation forming the ionic liquid may be:

an aliphatic chain quaternary salt such as tetraalkylammonium or tetraalkylphosphonium, an aliphatic cyclic ammonium such as pyrrolidinium, morpholinium, imidazolinium, tetrahydropyrimidinium, piperazinium, or piperidinium; or a nitrogen-containing heterocyclic aromatic cation such as pyridinium or imidazolium.

The anion forming the ionic liquid may be $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may include a lithium salt.

At least one of the positive electrode 201, the electrolyte layer 103, and the negative electrode 104 may include a binder for the purpose of improving the adhesion between the particles. The binder is used to improve the binding property of the material forming the electrode. Examples of the binder include polyvinylidene fluoride, polytetrafluoroethylene, polyethylene, polypropylene, aramid resin, polyimide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, and carboxymethylcellulose. As the binder, a copolymer of two or more kinds of materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, or hexadiene may be used. In addition, two or more kinds of selected from these may be mixed and used as the binder.

At least one of the positive electrode 201 and the negative electrode 104 may include a conductive agent for the purpose of improving electron conductivity. Examples of the conductive agent include graphite such as natural graphite or artificial graphite; carbon black such as acetylene black or ketjen black; a conductive fiber such as a carbon fiber or a metal fiber; carbon fluoride; metal powder such as aluminum; conductive whiskers such as zinc oxide or potassium titanate; a conductive metal oxide such as titanium oxide; or a conductive polymer compound such as polyaniline, polypyrrole, or polythiophene. Cost reduction can be achieved by using a carbon conductive agent as the conductive agent.

An example of the shape of the battery in the first embodiment may be a coin, a cylinder, a prism, a sheet, a button, a flat type, or a stacking structure.

<Manufacturing Method of First Solid Electrolyte Material and Second Solid Electrolyte Material>

The first solid electrolyte material and the second solid electrolyte material in the first embodiment may be manufactured by the following method, for example.

Binary halide raw material powders are prepared so as to provide a blending ratio of a target composition. For example, if $Li_3YCl_6$ is produced, LiCl and $YCl_3$ are prepared at a molar ratio of 3:1.

At this time, "M", "Me", and "X" in the above composition formula can be determined by selecting the kinds of the raw material powders. In addition, the values "α", "β", "γ", "d", "δ", "a", "x", and "y" can be adjusted by adjusting the raw materials, the blending ratio, and the synthesis process.

After the raw material powders are mixed well, the raw material powders are mixed and ground to react by a mechanochemical milling method. Alternatively, the raw material powders may be mixed well and then sintered in a vacuum.

Thereby, a solid electrolyte material including a crystal phase as described above is provided.

The configuration of the crystal phase (the crystal structure) in the solid electrolyte material can be determined by adjusting the reaction method and reaction conditions of the raw material powders.

EXAMPLES

Hereinafter, details of the present disclosure will be described with reference to inventive examples and comparative examples.

Inventive Example 1

[Production of First Solid Electrolyte Material]

In an argon glove box with a dew point of −60° C. or less, raw material powders LiCl and $YCl_3$ were prepared at a molar ratio of LiCl:$YCl_3$=2.7:1.1. Subsequently, milling processing was performed at 600 rpm for 25 hours using a planetary ball mill (manufactured by Fritsch, type P-5) to provide a powder of the first solid electrolyte material $Li_{2.7}Y_{1.1}Cl_6$.

[Production of Second Solid Electrolyte Material]

In an argon glove box having a dew point of −60° C. or less, raw material powders LiBr, LiCl, LiI, $YCl_3$, and $YBr_3$ were prepared at a molar ratio of LiBr:LiCl:LiI:$YCl_3$:$YBr_3$=1:1:4:1:1. Subsequently, milling processing was performed at 600 rpm for 25 hours using a planetary ball mill (manufactured by Fritsch, type P-7) to provide a powder of the second solid electrolyte material $Li_3YBr_2Cl_2I_2$.

[Production of Positive Electrode Active Material Coating Layer]

In an argon glove box, 5.95 g of ethoxylithium (manufactured by Koujundo chemical laboratory Co., Ltd.) and 36.43 g of pentaethoxy niobium (manufactured by Koujundo Chemical Laboratory Co., Ltd.) were dissolved in 500 mL of super-dehydrated ethanol (manufactured by FUJIFILM Wako Pure Chemical Corporation) to provide a coating solution.

A rolling flow granulating coating apparatus (manufactured by Powrex Corp., FD-MP-01E) was used to form a coating layer on the positive electrode active material Li(NiCoMn)$O_2$ (hereinafter, referred to as NCM). The amount of charge of the positive electrode active material, the number of rotations of stirring, and the liquid transfer rate were 1 kg, 400 rpm, and 6.59 g/min, respectively.

The treated powder was put in an alumina crucible and taken out under an air atmosphere.

Next, heat treatment was performed at 300° C. for one hour in the air.

The heat-treated powder was ground again in an agate mortar to provide the positive electrode active material in which the coating layer was formed on the surface of each of the particles.

The material of the coating layer was $LiNbO_3$.

[Production of Positive Electrode Material]

In the preparation of the positive electrode active material coating layer, NCM having the surface on which the coating layer was formed was used as the first positive electrode active material.

In addition, NCM having a surface on which the coating layer was not formed was used as the second positive electrode active material.

In the argon glove box, the first solid electrolyte material $Li_{2.7}Y_{1.1}Cl_6$ and the first positive electrode active material were prepared at a weight ratio of 30:70. By mixing these in an agate mortar, a first positive electrode material which was used for the first positive electrode layer was produced.

In the argon glove box, the first solid electrolyte material $Li_{2.7}Y_{1.1}Cl_6$ and the second positive electrode active material were prepared at a weight ratio of 30:70. By mixing these in an agate mortar, a second positive electrode material which was used for the second positive electrode layer was produced.

[Production of Sulfide Solid Electrolyte Material]

In an argon glove box having an Ar atmosphere with a dew point of −60° C. or lower, $Li_2S$ and $P_2S_5$ were prepared at a molar ratio of $Li_2S$:$P_2S_5$=75:25. These were ground and mixed in a mortar. Subsequently, a glassy solid electrolyte was provided by milling these at 510 rpm for 10 hours using a planetary ball mill (manufactured by Fritsch, type P-7). The glassy solid electrolyte was heat-treated at 270° C. for 2 hours in an inert atmosphere. As a result, $Li_2S$—$P_2S_5$, which was a glass ceramic solid electrolyte, was provided.

[Production of Secondary Battery]

The following steps were performed, using the first positive electrode material of the inventive example 1, the second positive electrode material of the inventive example 1, $Li_3YBr_2Cl_2I_2$, which was the second solid electrolyte material used for the electrolyte layer, and $Li_2S$—$P_2S_5$, which was a sulfide solid electrolyte material.

In an insulating outer cylinder, first, 60 mg of $Li_2S$—$P_2S_5$, 20 mg of the second solid electrolyte material $Li_3YBr_2Cl_2I_2$, 10 mg of the first positive electrode material, and 10 mg of the second positive electrode material were stacked sequentially. This was pressure-molded at a pressure of 360 MPa to provide a positive electrode and a solid electrolyte layer.

Next, 20 mg of aluminum powder was stacked on the second positive electrode material. This was pressure-molded at a pressure of 360 MPa to provide a current collector on the positive electrode.

Next, a metal In (thickness 200 μm), a metal Li (thickness 300 μm), and a metal In (thickness 200 μm) were stacked in this order on the $Li_2S$—$P_2S_5$. This was pressure-molded at a pressure of 80 MPa to produce a stacking structure consisting of the positive electrode, the solid electrolyte layer, and a negative electrode.

The reason why the $Li_2S$—$P_2S_5$ was stacked as the electrolyte layer was to maintain a sufficient distance between the positive electrode and the negative electrode and to prevent a short circuit.

Next, stainless steel current collectors were placed on the upper and lower parts of the stacking structure, and current collector leads were attached to the current collectors.

Finally, an insulating ferrule was used to block and seal the inside of the insulating outer cylinder from the outside atmosphere to produce a battery.

In this way, the battery of the inventive example 1 was produced.

Inventive Example 2

[Production of First Solid Electrolyte Material]

In an argon glove box with a dew point of −60° C. or less, raw material powders LiBr and $YBr_3$ were prepared at a molar ratio is LiBr:$YBr_3$=3:1. Subsequently, milling processing was performed at 600 rpm for 25 hours using a planetary ball mill (manufactured by Fritsch, type P-5) to provide a powder of the first solid electrolyte material $Li_3YBr_6$.

The same steps as those of the inventive example 1 were performed to provide a battery of the inventive example 2, except that $Li_3YBr_6$ was used as the first solid electrolyte material.

Inventive Example 3

[Production of First Solid Electrolyte Material]

In an argon glove box having a dew point of −60° C. or less, raw material powders LiCl, $YCl_3$, and $ZrCl_4$ were prepared at a molar ratio of LiCl:$YUCl$:$YCl_3$:$ZrCl_4$=2.5:0.5:0.5. Subsequently, milling processing was performed at 600 rpm for 25 hours using a planetary ball mill (manufactured by Fritsch, type P-5) to provide a powder of the first solid electrolyte material $Li_{2.5}Y_{0.5}Zr_{0.5}Cl_6$.

The same steps as those of the inventive example 1 were performed to provide a battery of the inventive example 3, except that $Li_{2.5}Y_{0.5}Zr_{0.5}Cl_6$ was used as the first solid electrolyte material.

Comparative Example 1

The same steps as those of the inventive example 1 were performed to provide a battery of the comparative example 1, except that the first positive electrode material was not used and that 20 mg of the second positive electrode material was used.

Comparative Example 2

The same steps as those of the inventive example 1 were performed to provide a battery of the comparative example 2, except that the second positive electrode material was not used and that 20 mg of the first positive electrode material was used.

Comparative Example 3

The same steps as those of the inventive example 2 were performed to provide a battery of the comparative example 3, except that the first positive electrode material was not used and that 20 mg of the second positive electrode material was used.

Comparative Example 4

The same steps as those of the inventive example 2 were performed to provide a battery of the comparative example 4, except that the second positive electrode material was not used and that 20 mg of the first positive electrode material was used.

Comparative Example 5

The same steps as those of the inventive example 3 were performed to provide a battery of the comparative example 5, except that the first positive electrode material was not used and that 20 mg of the second positive electrode material was used.

Comparative Example 6

The same steps as those of the inventive example 3 were performed to provide a battery of the comparative example 6, except that the second positive electrode material was not used and that 20 mg of the first positive electrode material was used.

[Charge Test]

Using each of the batteries of the inventive examples 1 to 3 and the comparative examples 1 to 6, a charge test was performed under the following conditions.

The battery was placed in a thermostatic chamber at 25° C.

The battery was charged with a constant current at a current value of 70 µA at a 0.05 C rate (20 hour rate) with respect to the theoretical capacity of the battery, and the charge was terminated at a voltage of 3.7 V.

In this way, the charge capacity of each of the batteries of the inventive examples 1 to 3 and the comparative examples 1 to 6 was provided. The results are shown in Table 1 below.

TABLE 1

| | First Positive electrode Material [mg] | Second Positive electrode Material [mg] | First solid electrolyte material | Second solid electrolyte material | Charge capacity (mAh/g) |
|---|---|---|---|---|---|
| Inventive Example 1 | 10 | 10 | $Li_{2.7}Y_{1.1}Cl_6$ | $Li_3YBr_2Cl_2I_2$ | 230.4 |
| Inventive Example 2 | 10 | 10 | $Li_3YBr_6$ | $Li_3YBr_2Cl_2I_2$ | 175.0 |
| Inventive Example 3 | 10 | 10 | $Li_{2.5}Y_{0.5}Zr_{0.5}Cl_6$ | $Li_3YBr_2Cl_2I_2$ | 207.5 |
| Comparative Example 1 | 0 | 20 | $Li_{2.7}Y_{1.1}Cl_6$ | $Li_3YBr_2Cl_2I_2$ | 192.9 |
| Comparative Example 2 | 20 | 0 | $Li_{2.7}Y_{1.1}Cl_6$ | $Li_3YBr_2Cl_2I_2$ | 115.4 |

TABLE 1-continued

|  | First Positive electrode Material [mg] | Second Positive electrode Material [mg] | First solid electrolyte material | Second solid electrolyte material | Charge capacity (mAh/g) |
|---|---|---|---|---|---|
| Comparative Example 3 | 0 | 20 | $Li_3YBr_6$ | $Li_3YBr_2Cl_2I_2$ | 151.6 |
| Comparative Example 4 | 20 | 0 | $Li_3YBr_6$ | $Li_3YBr_2Cl_2I_2$ | 137.8 |
| Comparative Example 5 | 0 | 20 | $Li_{2.5}Y_{0.5}Zr_{0.5}Cl_6$ | $Li_3YBr_2Cl_2I_2$ | 147.3 |
| Comparative Example 6 | 20 | 0 | $Li_{2.5}Y_{0.5}Zr_{0.5}Cl_6$ | $Li_3YBr_2Cl_2I_2$ | 125.5 |

<<Discussion>>

From the results of the comparative examples 1 and 2 and the inventive example 1 shown in Table 1, it was confirmed that, if a halide solid electrolyte including I was used for the electrolyte layer, the charge capacity of the battery of the inventive example 1, which comprised two layers of the first positive electrode layer and the second positive electrode layer, was increased, compared to the battery of the comparative example 1, which comprised only the second positive electrode layer, or the battery of the comparative example 2, which comprised only the first positive electrode layer.

From the results of the comparative examples 1 to 6 and the inventive examples 1 to 3 shown in Table 1, it was confirmed that, even in a case where the halide solid electrolyte used for the first solid electrolyte material was different, similarly, the charge capacity of the battery which comprised two layers of the first positive electrode layer and the second positive electrode layer was increased, compared to the battery which comprised only the first positive electrode layer or the battery which comprised only the second positive electrode layer.

INDUSTRIAL APPLICABILITY

The battery of the present disclosure can be used, for example, as an all-solid lithium secondary battery.

REFERENTIAL SIGNS LIST

1000 Battery
201 Positive electrode
101 First positive electrode layer
102 Second positive electrode layer
103 Electrolyte layer
104 Negative electrode
110 First positive electrode active material particle
111 First solid electrolyte particle
112 Second positive electrode active material particle
113 Coating layer
114 Second solid electrolyte particle

The invention claimed is:

1. A battery, comprising:
   a positive electrode including a first positive electrode layer and a second positive electrode layer;
   a negative electrode; and
   an electrolyte layer located between the positive electrode and the negative electrode, wherein:
   the first positive electrode layer is located between the second positive electrode layer and the electrolyte layer,
   the first positive electrode layer includes a first positive electrode active material particle, a first solid electrolyte material particle, and a coating material located on a surface of the first positive electrode active material particle,
   the second positive electrode layer includes a second positive electrode active material particle and the first solid electrolyte material particle,
   the second positive electrode active material particle is not covered by the coating material,
   the first solid electrolyte material particle is a material represented by a composition formula $Li_\alpha M_\beta X_\gamma$,
   where
   M comprises Y and at least one selected from the group consisting of metalloid elements and metal elements other than Li,
   X is at least one kind selected from the group consisting of Cl and Br, and
   $2.5 \leq \alpha \leq 3$, $1 \leq \beta \leq 1.1$, and $\gamma = 6$ are satisfied,
   the coating material comprises an oxide solid electrolyte,
   the first solid electrolyte material particle does not include sulfur,
   the electrolyte layer includes a second solid electrolyte material particle, and
   the second solid electrolyte material particle is represented by a composition formula $Li_{6-3d}Y_d X'_6$,
   where
   $0 < d < 2$, and
   X' includes I and at least one kind selected from the group consisting of Cl and Br.

2. The battery according to claim 1, wherein
the second solid electrolyte material particle is a material represented by $Li_3YBr_2Cl_2I_2$.

3. The battery according to claim 1, wherein
the coating material comprising the oxide solid electrolyte comprises lithium niobate.

4. The battery according to claim 1, wherein
the first positive electrode active material particle and the second positive electrode active material particle are made of the same material as each other.

5. The battery according to claim 1, wherein
at least one of the first positive electrode active material particle and the second positive electrode active material particle is made of lithium nickel-cobalt-manganese oxide.

6. The battery according to claim 1, wherein
the electrolyte layer further includes a sulfide solid electrolyte material.

7. The battery according to claim 6, wherein
the sulfide solid electrolyte material includes $Li_2S$—$P_2S_5$.

* * * * *